(12) United States Patent
Ricci et al.

(10) Patent No.: US 7,431,049 B2
(45) Date of Patent: Oct. 7, 2008

(54) VALVE FOR WITHDRAWAL OF A SUBSTANCE FROM A CONTAINER

(75) Inventors: Robert S. Ricci, Milwaukee, WI (US); Harry Tugurian, Oak Creek, WI (US)

(73) Assignee: Sigma-Aldrich Co., St. Louis, MO (US)

( * ) Notice: Subject to any disclaimer, the term of this patent is extended or adjusted under 35 U.S.C. 154(b) by 136 days.

(21) Appl. No.: 11/391,071

(22) Filed: Mar. 28, 2006

(65) Prior Publication Data

US 2006/0213564 A1    Sep. 28, 2006

Related U.S. Application Data

(60) Provisional application No. 60/665,920, filed on Mar. 28, 2005.

(51) Int. Cl.
*F16K 11/065* (2006.01)
(52) U.S. Cl. ............... 137/625.43; 137/625.48
(58) Field of Classification Search ............ 137/625.43, 137/625.48
See application file for complete search history.

(56) References Cited

U.S. PATENT DOCUMENTS

| | | | |
|---|---|---|---|
| 2,333,036 A | 10/1943 | Orndorff | |
| 2,471,285 A * | 5/1949 | Rice | 137/625.43 |
| 2,531,511 A * | 11/1950 | Hill | 137/625.43 |
| 3,272,404 A | 9/1966 | Graves et al. | |
| 3,511,273 A | 5/1970 | Bartholomaus | |
| 4,805,675 A | 2/1989 | Joseph et al. | |
| 5,152,265 A * | 10/1992 | Hummel et al. | 137/625.43 |

FOREIGN PATENT DOCUMENTS

FR        1078126        11/1945

* cited by examiner

*Primary Examiner*—John Fox
(74) *Attorney, Agent, or Firm*—Senniger Powers LLP

(57) ABSTRACT

A valve has a housing defining a bore. Two bottom ports and two side ports in the housing communicate with the bore. Two annular grooves are in the outer surface of a spool received in the bore. A bypass extends within the spool from an annular groove to a bypass port. In one embodiment, the bore extends only partially through the housing and the bypass port is at an end of the spool. In another embodiment, the bypass port is on the outer cylindrical surface of the spool at a location substantially devoid of annular grooves therein. An actuator permits selective movement of the spool within the bore between a first position in which the first bottom port communicates with the first side port and the second bottom port communicates with the second side port and a second position, in which the first and second bottom ports communicate with each other and the first and second side ports communicate with each other. The valve has reduced dead space, making it desirable for use with aggressive chemical products.

14 Claims, 10 Drawing Sheets

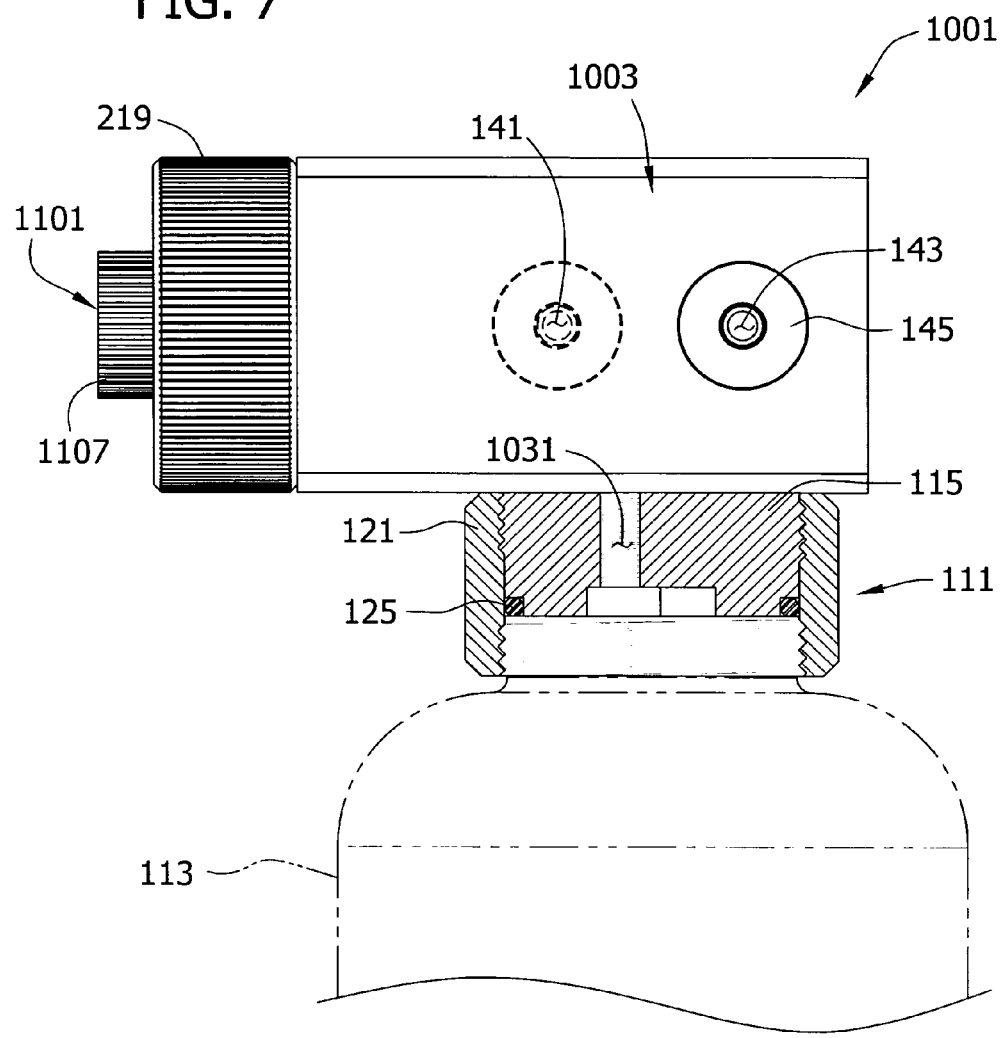

VALVE FOR WITHDRAWAL OF A SUBSTANCE FROM A CONTAINER

CROSS-REFERENCE

This application claims priority from Provisional Application Ser. No. 60/665,920, filed Mar. 28, 2005, which is hereby incorporated by reference in its entirety.

FIELD OF THE INVENTION

The invention relates generally to valves used in the withdrawal of chemical products from containers wherein a gas is used to displace the product from the container, and in particular to spool valves having passages therethrough for passage of the gas into the containers and passage of the product out of the containers.

BACKGROUND

Substances required for the manufacture of semiconductors are often toxic and/or chemically aggressive. In fiber optic technology, toxic and chemically aggressive acid halides are typically stored in glass containers or stainless steel vessels. Impurities in the containers which are used for the storage and transport of these substances can lead to considerable problems and must therefore be excluded. For such applications, chemically resistant spool valves can be used to withdraw the product using a protective gas, such as an inert gas, to displace the product from or carry it out of the container. In most cases the protective gas is also used for flushing the connected lines after withdrawal. Steel ball valves may be used for withdrawal of product from stainless steel vessels. For glass vessels, plug valves have been used. Although plug valves allow flushing with the protective gas, they may not seal adequately. Other glass and/or PTFE valves have also been used for applications of this type.

One particular valve is a spool valve as disclosed in U.S. Pat. No. 4,805,675, which is hereby incorporated by reference. The spool valve of the '675 patent has a cylindrical valve spool which is axially moveable in a bore through a valve housing. The valve spool has a first annular groove in its outer surface which, in the open position of the valve, connects a product supply line (e.g., a diptube) to a product withdrawal line (i.e., a line to a location where the product is to be delivered). The valve spool also has a second annular groove in its outer surface which, in the open position of the valve, connects a protective gas supply line (e.g., a line from a pressurized supply of protective gas to the valve) to a gas injection line (i.e., a line from the valve into the container). A third annular groove is formed in the outer surface of the valve spool so that the first annular groove is between the second and third annular grooves along the axis of the spool. The third annular groove is connected to the second annular groove by a bypass passageway through the valve spool so the third annular groove is filled with gas having a pressure about equal to the pressure in the first annular groove. Thus, the second annular groove, which is used for passage of the product through the valve, is flanked on both sides by the protective gas in the first and third annular grooves, thereby (according to the '675 patent) reducing the risk of contamination leaking into the second groove from outside the container and reducing the risk that product will leak from the second groove out of the valve through the joint between the spool and the housing. Further, when the valve is in its closed position, the second annular groove remains in fluid communication with the gas supply line, but is sealed from fluid communication with the gas withdrawal line. The third annular groove is also connected to the product withdrawal line when the valve is in its closed position, which results in flushing of the product withdrawal line with the protective gas to purge product from portions of the valve and the product withdrawal line.

The valve disclosed in the '675 patent has some disadvantages. First, it is expensive to manufacture the annular grooves in the valve spool. Also manufacture of the bypass passageway requires formation of a longitudinal bore, formation of two radial bores, and plugging of the end of the longitudinal bore. Further, it would be desirable to reduce the amount of internal space in the valve in which the product stagnates (i.e., dead space). Dead space is undesirable because the aggressive product can react with the materials used in the construction of the valve, in particular by leaching metals or other extractable contaminants from the valve components between uses of the valve. Dead space also increases the risk of cross contamination of different batches of product when the same valve is used to transfer product from containers holding the different product batches. Moreover, the ports for connection of the product supply tube and the gas withdrawal line are confusingly similar in appearance increasing the risk that the product supply tube and gas withdrawal line will not be properly connected to the valve for the intended application. Still further, when the valve is used with a toxic chemical product there is concern that the product might leak out of the valve through the joint between the valve spool and the valve housing.

SUMMARY OF THE INVENTION

One embodiment of a valve for withdrawing a flowable product from a container containing a supply of the flowable product comprises a housing defining a cylindrical bore having a longitudinal axis. First and second bottom ports in the housing communicate with the bore and first and second side ports in the housing communicate with the bore. A cylindrical valve spool is received in the bore and axially moveable along the longitudinal axis of the bore. The valve spool comprises an outer cylindrical surface. First and second annular grooves in the outer cylindrical surface are distributed axially therealong. A bypass within the valve spool extends from the second annular groove through a radial bore in the valve spool to a bypass port. The radial bore extends to an intersection with the outer cylindrical surface of the valve spool. The outer surface of the valve spool is substantially devoid of annular grooves at the location of the intersection. The first annular groove is located axially on the spool between the second annular groove and the bypass port. The valve also comprises a valve spool actuator for selectively sliding the valve spool within the bore between a first position and a second position. When the spool is in the first position the first bottom port communicates with the first side port via the first annular groove and the second bottom port communicates with the second side port via the second annular groove. When the spool is in the second position the first and second bottom ports communicate with each other through the first annular groove and the first and second side ports communicate with each other through the bypass and the second annular groove.

Another embodiment of a valve for withdrawing a flowable product from a container containing a supply of the flowable product comprises a housing defining a cylindrical bore having a longitudinal axis. The bore extends only part of the way through the housing. First and second bottom ports in the housing communicate with the bore and first and second side ports in the housing communicate with the bore. A cylindrical valve spool is received in the bore and axially moveable along the longitudinal axis of the bore. The valve spool comprises an outer cylindrical surface. First and second annular grooves in the outer cylindrical surface are distributed axially therealong. A bypass within the valve spool extends from the second annular groove to a bypass port at one end of the valve spool. The first annular groove is located axially on the spool between the second annular groove and said one end of the valve spool. The further comprises a valve spool actuator for selectively sliding the valve spool within the bore between a first position and a second position. When the spool is in the first position the first bottom port communicates with the first side port via the first annular groove and the second bottom port communicates with the second side port via the second annular groove. When the spool is in the second position the first and second bottom ports communicate with each other through the first annular groove and the first and second side ports communicate with each other through the bypass and the second annular groove.

Other objects and features will be in part apparent and in part pointed out hereinafter.

BRIEF DESCRIPTION OF THE DRAWINGS

FIG. 7 is a side elevation of the valve in FIG. 6 showing a portion of the valve in section.

Corresponding reference characters indicate corresponding parts throughout the drawings.

DESCRIPTION OF THE PREFERRED EMBODIMENT

Figure 1:
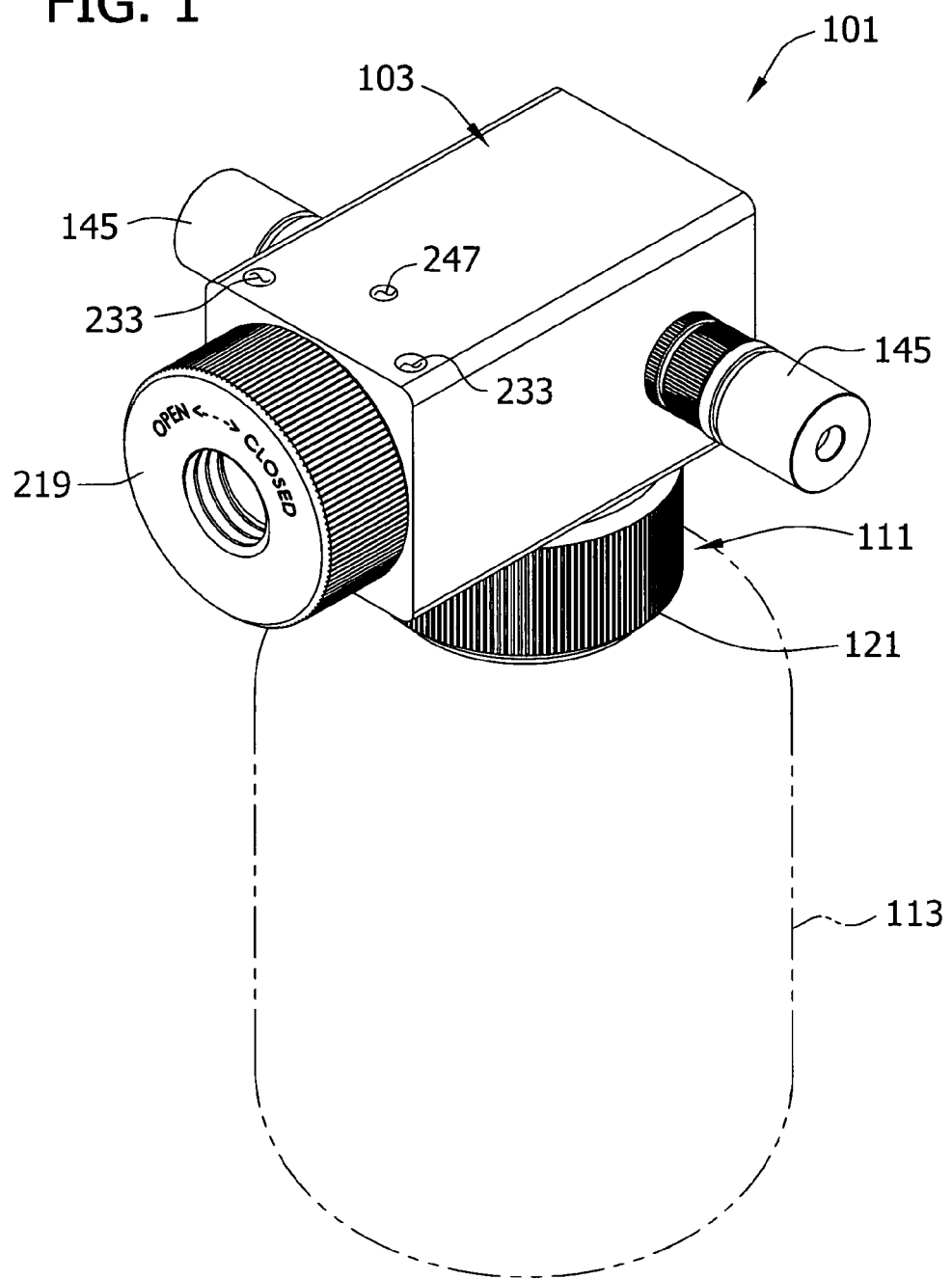
FIG. 1 is a perspective of one embodiment of a valve of the present invention.
Figure 2:
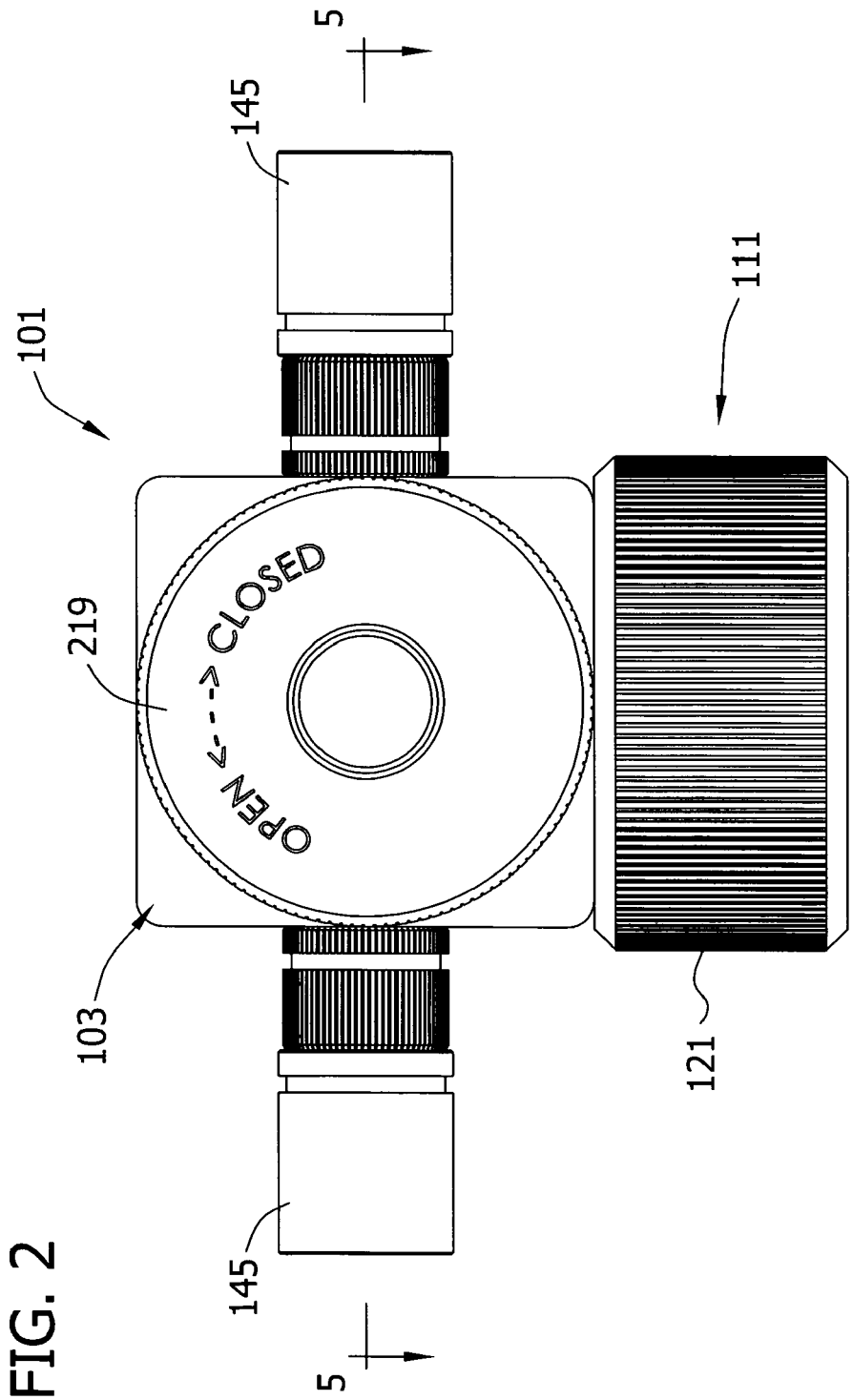
FIG. 2 is an end view of the valve shown in FIG. 1.

Referring now to the drawings, first to FIGS. 1-5B, one embodiment of a valve of the present invention is generally designated 101. The valve 101 comprises a valve housing 103 with a central bore 105 which receives a cylindrical valve spool 107 that is axially moveable between an open position (shown FIG. 5A) and a closed position (shown FIG. 5B). The valve housing 103 and valve spool 107 are preferably made from an inert substance having a high resistance to chemical reaction and a low level of metals and other extractable contaminants. In one embodiment, the valve housing 103 and valve spool 107 comprise fully fluorinated polymers, such as PFA, TFE, PTFE, FEP, ETFE, or the like.

Figure 4:
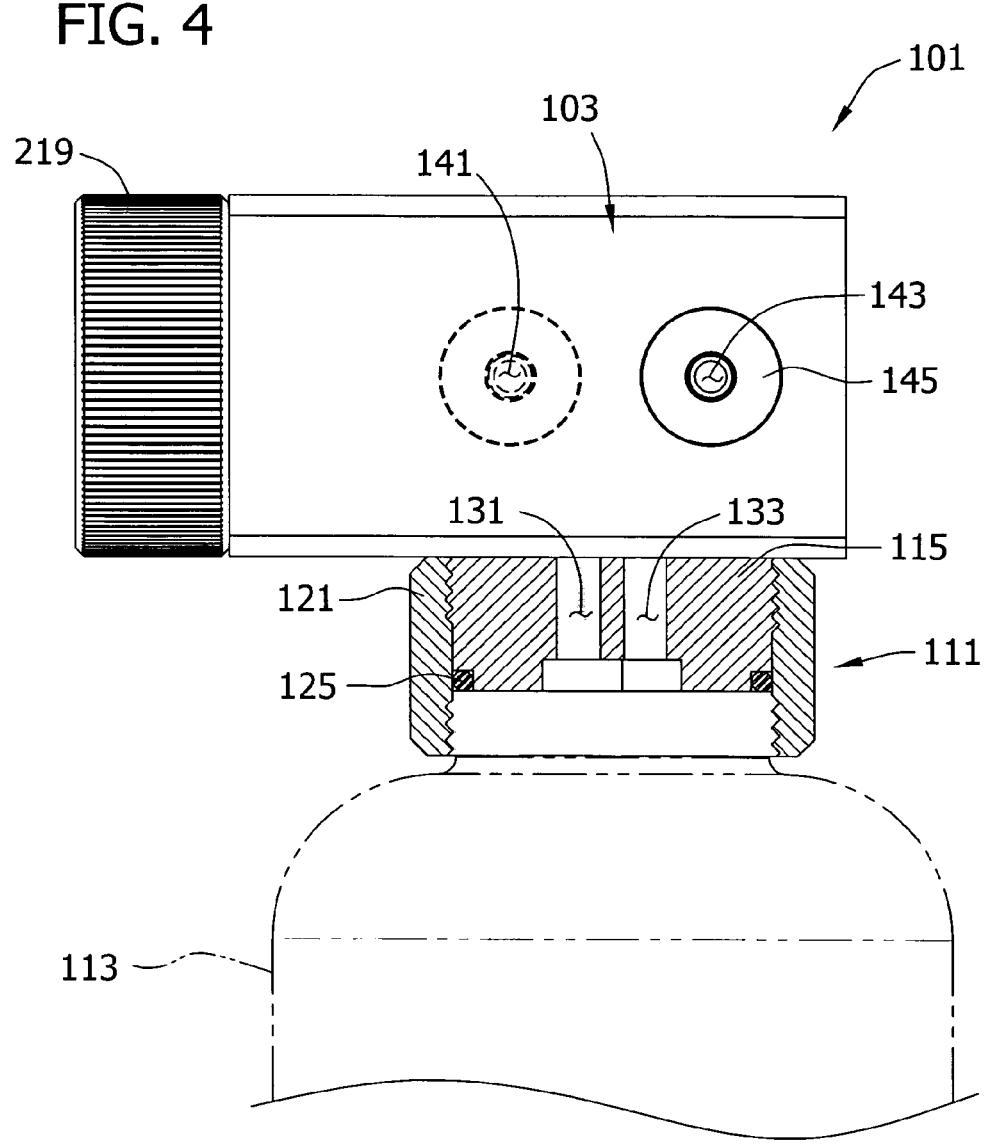
FIG. 4 is a side elevation of the valve shown in FIG. 1 showing a portion of the valve in section.

On the underside of the valve housing 103 there is a connector 111 for releasably connecting the valve 101 to an open-mouthed container 113, which is shown in phantom in FIG. 1, that contains a quantity of a chemical product (not shown) having aggressive chemical properties (e.g., an ultra high-purity acid halide, such as Silicon tetrachloride, Germanium (IV) chloride, Phosphorous oxychloride, or the like). As shown in FIG. 4, for example, the connector 111 may comprise a cylindric fitting 115 on the bottom of the housing. The fitting 115 has external threads carrying a union nut 121 which is adapted to be screwed onto a corresponding collar formed on the mouth of the container 113. The external threads of the fitting 115 and the corresponding threads on the union nut 121 are preferably left-handed threads while the remainder of the threads on the union nut are right-handed threads for screwing the connector 111 onto a container 113 having external right-handed threads formed thereon. An O-ring 125 (FIG. 4) may be provided to seal the connection of the valve 101 to the container 113. The O-ring 125 is preferably resistant to aggressive chemical degradation. For example, the O-ring 125 may be encapsulated with a fully fluorinated elastomer (e.g. Teflon® (E.I. Du Pont De Nemours and Company Corporation, Wilmington, Del.)) to reduce the risk that the O-ring will contaminate the chemical product. Alternatively, the O-ring 125 may be constructed of a fully fluorinated elastomer (FFKM), e.g., Simriz® SZ485 (which is available from Simrit, a division of Freudenberg-NOK, of Plymouth, Mich.) or Kalrez® 4079 (which is available from Dow Performance Elastomers of Wilmington, Del., formerly Dow DuPont Elastomers), to reduce the risk of contamination of the chemical product. Although an O-ring 125 that is encapsulated with a chemically-resistant material may provide excellent initial properties, there is a risk that the encapsulation will lose integrity over time, which may make FFKM O-rings preferable, despite the added expense.

Two bottom valve ports 131, 133 are formed in the fitting 115 and communicate with the bore 105 in the valve housing 103. The bottom ports 131, 133 shown in the drawings are generally parallel to each other and enter the bore 105 substantially vertically. The bottom ports 131, 133 are offset from one another along the longitudinal axis of the bore 105. Referring to the embodiment shown in FIGS. 5A and 5B, for example, one of the bottom ports 131 (hereinafter the "central bottom port") communicates with the bore 105 at a location relatively closer to the longitudinal center of the bore and the other of the bottom ports 133 (hereinafter the "offset bottom port") communicates with the bore at a location relatively farther from the longitudinal center of the bore. The bottom ports 131, 133 are preferably readily distinguishable from one another, which is helpful in the event a sparging tube (not shown) is to be connected to one of the bottom ports. For example, in one embodiment the central bottom port 131 is adapted for connection of such a tube (not shown) thereto (e.g., by formation of internal threads thereon as indicated by phantom lines in FIGS. 3 and 4), and the offset bottom port 133 is not adapted for connection of the tube thereto (e.g., by absence of threads thereon as indicated by a absence of phantom lines on FIGS. 3 and 4) to discourage inadvertent connection of the tube to the offset bottom port. In another embodiment (not shown), the central bottom port 131 is adapted for connection of a tube by a particular thread system and the offset bottom port 133 is adapted for connection of a tube by a different type of thread system. For example, one of the central bottom port 131 and offset bottom port 133 can have right hand threads and the other have left hand threads. Similarly, one of the central bottom port 131 and offset bottom port 133 can have a male threaded connection and the other have a female threaded connection. In still another embodiment (not shown), the central bottom port 131 is adapted for connection of a tube having a particular diameter (e.g., ⅜ inch) and the offset bottom port 133 is adapted for connection of a tube having a different diameter (e.g., ¼ inch). When the valve 101 is used to transfer the product from the container 113, gas is injected into the container through one of the two bottom ports 131, 133, which will vary depending on the mode of operation as discussed in more detail below, and product flows out of the container through the other of the two bottom ports.

Figure 5A:
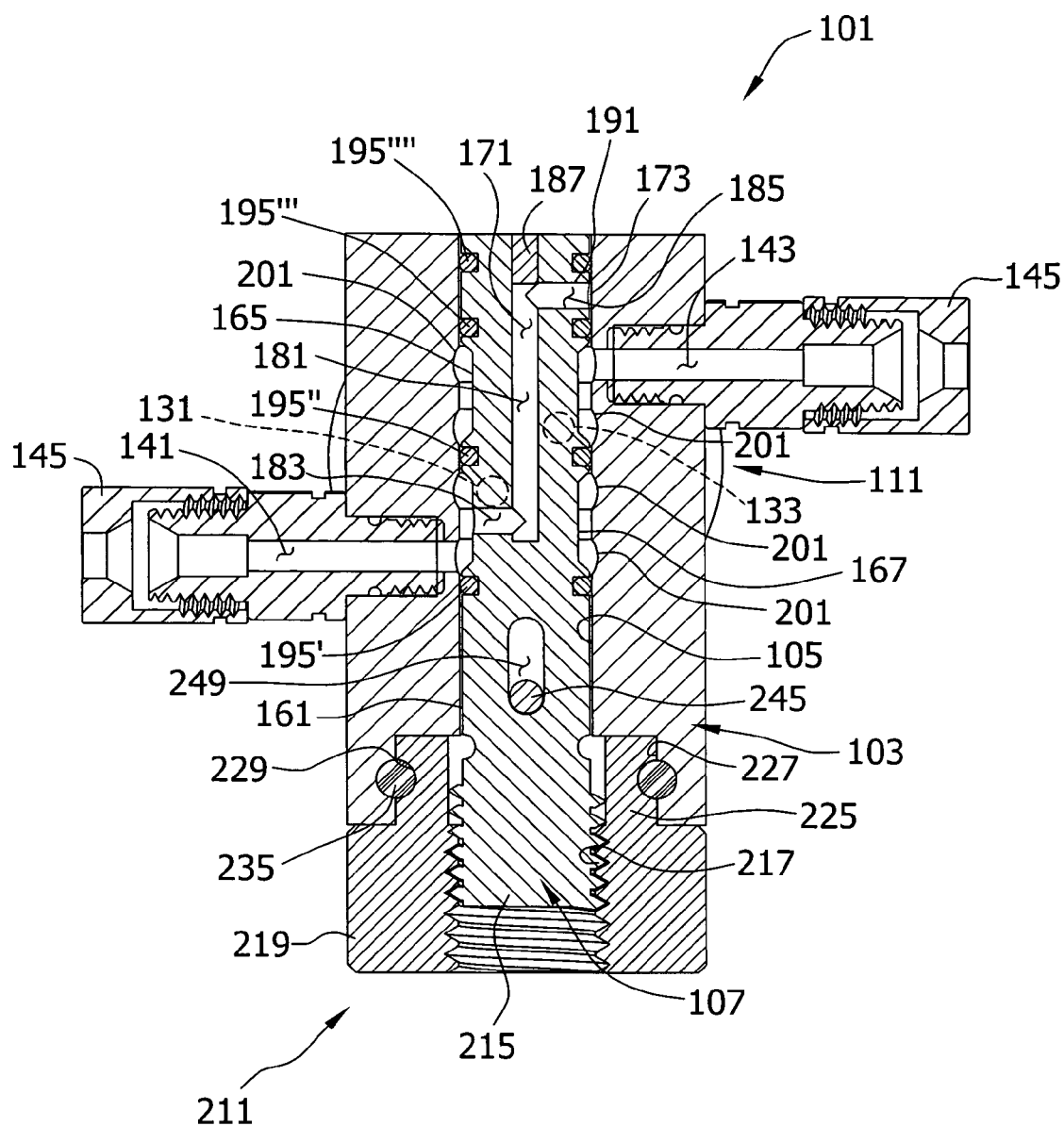
FIGS. 5A and 5B are sections on the plane 5-5 of FIG. 2 showing the valve in open and closed positions, respectively.
Figure 5B:
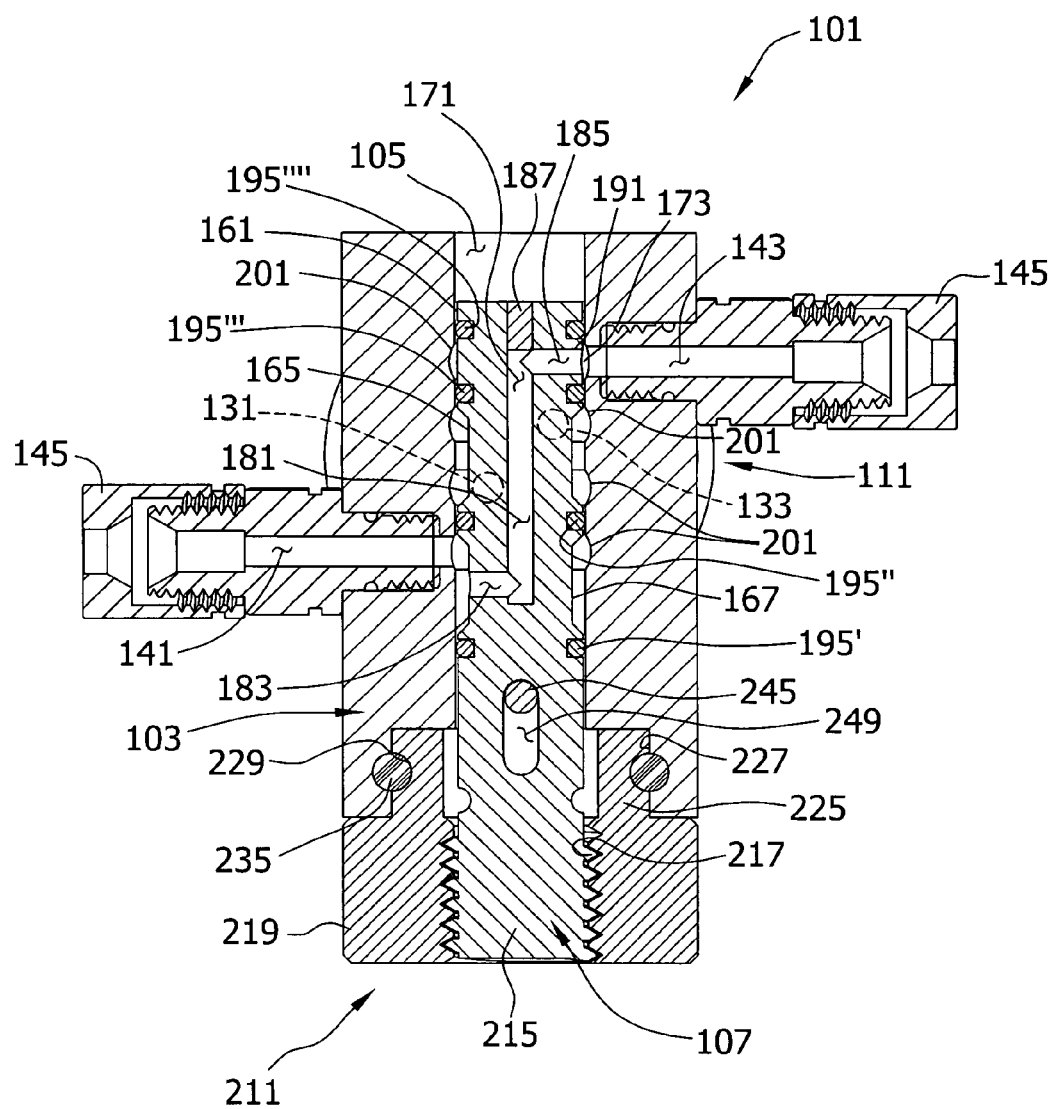

Two side valve ports 141, 143 are formed on the sides of the valve housing 103 and communicate with the bore 105. The side ports 141, 143 of the embodiment shown in the drawings are generally parallel and enter opposite sides of the housing 103 horizontally. Fittings 145 may be connected to the side ports 141, 143 (e.g., screwed into the side ports) to facilitate connection of a gas supply line (not shown) and product withdrawal line (not shown) thereto. The side ports 141, 143 are offset from each other along the longitudinal axis of the bore 105. Referring to FIGS. 5A and 5B, for example, one of the side ports 141 (hereinafter the "central side port") communicates with the bore 105 at a location relatively closer to the longitudinal center of the bore and the other side port 143 (hereinafter the "offset side port") and communicates with the bore at a location relatively farther from the longitudinal center of the bore. In the embodiment shown in FIGS. 5A and 5B, the offset side port 143 communicates with the bore 105 at a location that is relatively farther from the longitudinal center of the bore than the locations at which the bottom ports 131, 133 communicate with the bore and the central side port 141 communicates with the bore at a location that is relatively closer to the longitudinal center of the bore than the locations at which the bottom ports communicate with the bore. Consequently, the bottom ports 131, 133 are positioned between the side ports 141, 143 on the longitudinal axis of the bore 105. During withdrawal of product from the container 113, one of the two side ports 141, 143 (depending on the mode of operation as explained below) is connected to the supply of protective gas (not shown) and the other of the side ports is connected to the product transfer line (not shown).

The valve spool 107 has a substantially cylindrical outer surface 161, except as noted herein. A first annular groove 165 is formed in this outer cylindrical surface 161. When the valve spool 107 is in its open position (FIG. 5A) the offset side port 143 is in fluid communication with the offset bottom port 133 via the first annular groove 165. A second annular groove 167 is also formed in the outer cylindrical surface 161 of the valve spool 107. In the embodiment shown in the drawings, the second annular groove 167 is relatively closer to the longitudinal center of the valve spool 107 and the first annular groove 165 is relatively farther from the longitudinal center of the valve spool valve. When the valve spool 107 is in its open position (FIG. 5A), the central side port 141 is in fluid communication with the central bottom port 131 via the second annular groove 167.

A bypass 171 is formed within the valve spool 107 extending from the second annular groove 167 to a bypass port 173 formed in the outer cylindrical surface 161 of the spool 107. The bypass port 173 in the embodiment shown in the drawings is located relatively farther from the longitudinal center of the spool 107 than both the first 165 and second 167 annular grooves. Referring to FIGS. 5A and 5B, for example, the bypass 171 of the embodiment shown in the drawings comprises a longitudinal passage 181 within the spool 107, a first radial bore 183 in the valve spool extending from the longitudinal passage 181 to the second annular groove 167, and a second radial bore 185 in the spool extending from the longitudinal passage to the bypass port 173. A plug 187 is used to seal the end of the longitudinal passage 181. Significantly, the bypass port 173 is formed in the valve spool 107 without forming an annular groove in the outer surface 161 of the valve spool at the intersection of the radial bore 185 and the substantially cylindrical outer surface of the valve spool, which reduces the cost of manufacturing the valve 101. In the embodiment shown in FIGS. 5A and 5B, for example, the bypass port 173 is formed at an intersection 191 of the radial bore 185 with the outer cylindrical surface 161 of the valve spool 107. Further, the outer surface 161 of the valve spool 107 is substantially devoid of annular grooves at the location of said intersection 191. When the valve spool 107 is in its closed position (FIG. 5B) the bottom ports 131, 133 are in fluid communication with one another via the first annular groove 165. Meanwhile the side ports 141, 143 are in fluid communication with one another via the bypass 171. There is substantially no fluid communication between either of the bottom ports 131, 133 and the side ports 141, 143 when the valve spool 107 is in its closed position (FIG. 5B).

As shown in FIGS. 5A and 5B, one of four O-rings 195', 195", 195'", 195"" is seated in each of a series of four annular channels distributed axially along the outer surface 161 of the valve spool 107. The O-rings form seals by concurrent engagement of the valve spool 107 and the valve housing 103. The first O-ring 195' forms a seal between the second annular groove 167 and a joint between the valve housing 103 and the valve spool 107. The second O-ring 195" forms a seal between the first 165 and second 167 annular grooves. The third O-ring 195'" forms a seal between the first annular groove 165 and the bypass port 173. The fourth O-ring 195"" forms a seal between the bypass port 173 and a joint between the valve housing 103 and the valve spool 107. The O-rings 195', 195", 195'", 195"" are preferably made from an elastomeric material having high resistance to chemical reaction and containing a low level of metals or other extractable contaminants. For example, the O-rings 195', 195", 195'", 195"" may comprise a fully fluorinated elastomer (FFKM), such as Simriz® SZ485 and/or Kalrez® 4079. Still referring to FIGS. 5A and 5B, a series of circumferential grooves 201 is preferably formed in the bore 105 of the valve housing 103 at locations distributed longitudinally along the bore 105 to coincide with the locations at which the ports 131, 133, 141, 143 communicate with the bore to reduce the frictional wear of the O-rings 195', 195", 195'", 195"" from movement of the valve spool 107 back and forth between its open (FIG. 5A) and closed (FIG. 5B) positions. Additional O-rings can also be used (e.g., adjacent 195' and 195"") if desired to make the valve 101 more resistant to leaks.

The valve 101 further comprises a valve spool actuator 211 that is operable to move the valve spool 107 axially back and forth between its open (FIG. 5A) and closed (FIG. 5B) positions. In the embodiment shown in the drawings, for example, one end 215 of the valve spool 107 has an external thread which is engaged in the internal thread 217 of an actuating knob 219. The actuating knob 219 is rotatably mounted on the valve housing 103 for rotation about the longitudinal axis of the valve spool 107. The knob 219 is constrained, however, against translation relative to the valve housing 103 in the direction of the longitudinal axis of the valve spool 107. In the embodiment shown in the drawings, for example, the knob 219 comprises a boss 225 sized to fit inside a counterbore 227 formed in the valve housing 103. An annular groove 229 is formed in the outer surface of the boss 225 so that the groove is aligned with a pair of through holes 233 formed in the valve housing 103 when the boss is inserted into the counterbore 227. Pins 235 are inserted through the through holes 233 to constrain axial movement of the knob 219 with respect to the valve housing 103 by engagement of the pins with the annular groove 229 formed in the boss 225. Accordingly, rotation of the knob 219 causes the valve spool 107 to move axially in the bore 105 of the valve housing 103. A peg 245 is inserted through a through hole 247 in the valve housing 103 and into an elongated slot 249 in the valve spool 107 to prevent the valve spool from rotating with respect to the valve housing. The length of the elongated slot 249 also limits the axial movement of the valve spool 107.

Figure 3:
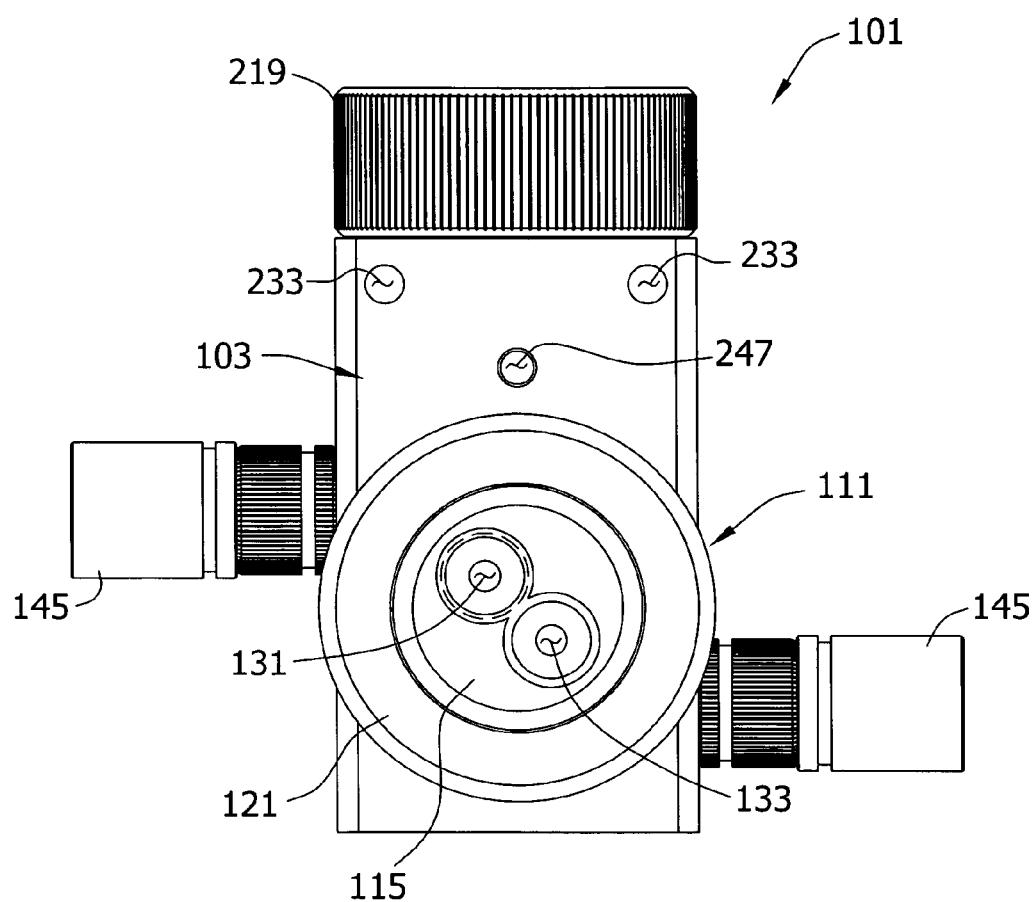
FIG. 3 is a bottom view of the valve shown in FIG. 1.

To use the valve 101 to withdraw product from a container 113, the valve is connected to the container as shown in FIG. 1. Consequently, as shown in FIG. 3, the two bottom ports 131, 133 extend into the container 113 and the two side ports 141, 143 are outside the container. A gas supply line (not shown) is connected to one of the side ports 141, 143 and a product transfer line (not shown) is connected to the other of the side ports. A tube (not shown) is also preferably connected to the central bottom port 131 so it extends from the central bottom port into the product contained in the container. The manner in which the gas supply line and the product transfer lines are connected to the side ports 141, 143 depends how the product is to be removed from the container.

In one mode of operation the valve 101 is used for bubbling. In bubbling mode, the gas supply line (not shown) is connected to the central side port 141 and the product transfer line (not shown) is connected to the offset side port 143. Thus, when the valve spool 107 is in its open position (FIG. 5A), gas flows from the gas supply into the valve through the central side port 141, through the second annular groove 167, out of the valve 101 through the central bottom port 131, and into the product through the tube (which in this mode of operation is a sparging tube) (not shown). The product is vaporized in the gas bubbles formed by injection of the protective gas into the product through the sparging tube, resulting in the gas becoming a carrier gas for the vaporized product. The carrier gas and product vapors flow into the valve 101 through the offset bottom valve 133, through the first annular groove 165, out of the valve through the offset side port 143, and then into the product transfer line which directs the carrier gas and product vapors to a desired location.

When a desired amount of the product has been withdrawn from the container 113, the knob 219 is turned to move the valve spool 107 to its closed position (FIG. 5B). In this closed position, the two bottom ports 131, 133 are connected to each other via the first annular groove 165, but the container 113 is otherwise sealed. On the other hand, the two side ports 141, 143 are connected to one another via the bypass 171. Thus, the protective gas flows from the gas supply into the valve 101 through the central side port 141, through the valve via the bypass 171, and out of the valve through the offset side port 143. This flushes the offset side port 143 and the product transfer line with the protective gas to facilitate purging of the product therefrom.

In another mode of operation, the valve 101 is used for closed transfer of liquid product out of the container 113. All that is required to convert the valve 101 from the bubbling mode to the closed liquid transfer mode is to reverse the connection of the gas supply line (not shown) and the product transfer line (not shown) to the side ports 141, 143, or to disconnect the tube from the central bottom port 131 and connect it (or another suitable tube) to the offset bottom port 133. Thus, for operation in closed liquid transfer mode, the gas supply line is connected to the offset side port 143 and the product transfer line is connected to the central side port 141. When the valve 101 is in its open position, gas from the gas supply is used to pressurize the container 113 through the offset side port 143, first annular groove 165, and offset bottom port 133. The liquid product flows up the tube (which is now acting as a dip tube) (not shown) that is connected to the central bottom port 131, into the valve through the central bottom port, through the second annular groove 167, out of the valve through the central side port 141 and into the product transfer line. Upon withdrawal of a desired amount of the liquid product from the container 113, the knob 219 is turned to move the valve spool 107 to its closed position. As was the case in the bubbling mode, the two bottom ports 131, 133 are connected to each other via the first annular groove 165 when the valve 101 is in its closed position (FIG. 5B), but the container 113 is otherwise sealed. Meanwhile the protective gas flows into the valve 101 through the offset side port 143, through the bypass 171, and out through the central side port 141, which facilitates purging of product therefrom.

FIGS. 6-8B show a second embodiment of a valve of the present invention, generally designated 1001. The valve 1001 is similar to valve 101 except as noted. The valve 1001 comprises a valve housing 1003 with a central bore 1005 which receives a cylindrical valve spool 1007 that is axially moveable between an open position (shown FIG. 8A) and a closed position (shown FIG. 8B). The bore 1005 extends only part of the way through the housing 1003, so that one end 1005a of the bore is closed.

Figure 6:
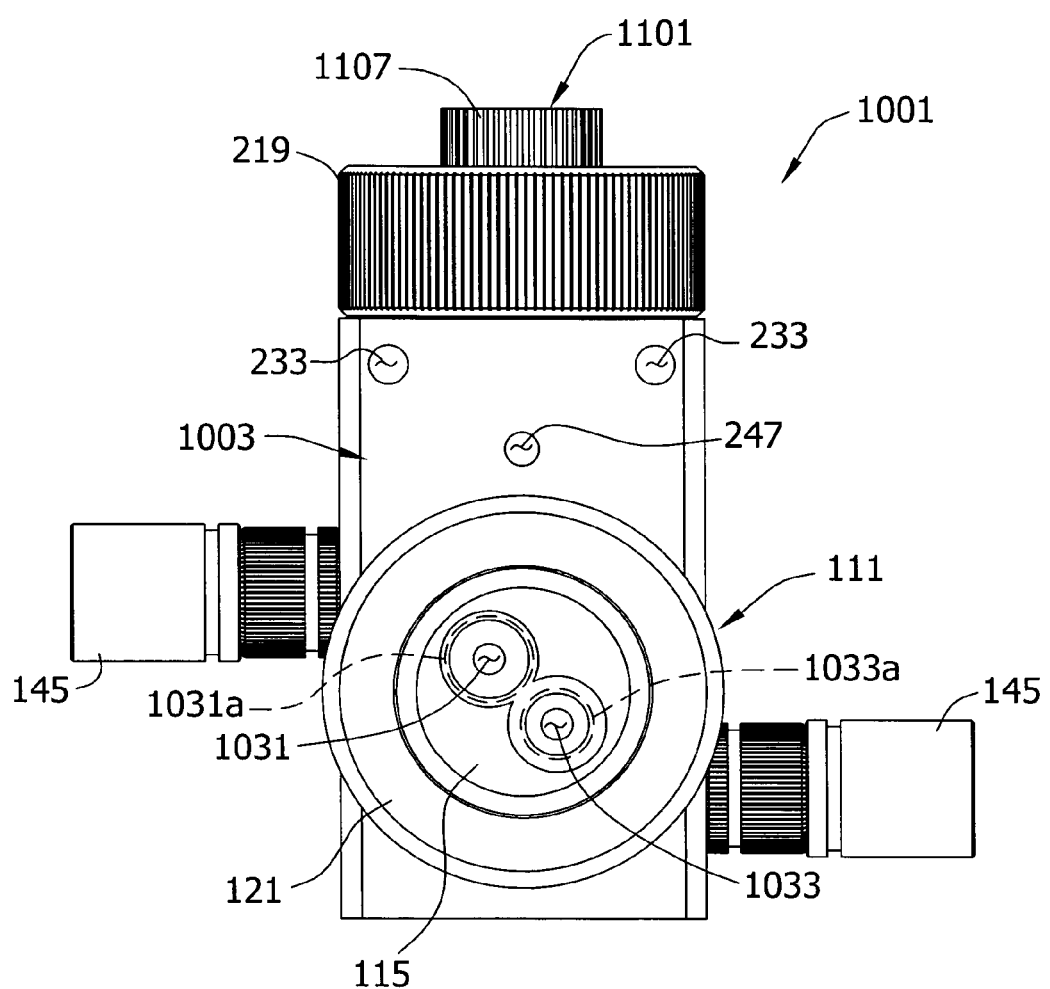
FIG. 6 is bottom view of a second embodiment of a valve of the present invention.

Two bottom valve ports 1031, 1033 and two side valve ports 141, 143 communicate with the bore 1005 in the same way described for valve 101 above. In contrast to valve 101, however, the central and offset bottom valve ports 1031, 1033 of the valve 1001 are both threaded for connection of tubes thereto. The bottom ports 1031, 1033 are preferably readily distinguishable from one another (e.g., by being sized differently). For example, as shown in FIG. 6, the central bottom port 1031 may comprise a threaded bore 1031a sized for connection of a particular tube (e.g., a sparging tube, not shown) thereto while the offset bottom port 1033 may comprise a threaded bore 1033a having a different size that is incompatible for connection of the particular tube thereto to discourage inadvertent connection of that tube to the offset bottom port. Meanwhile, the threaded bore 1033a of the offset bottom port 1033 may be sized for connection of a different tube (e.g., a diptube, not shown) thereto, in which case the different size of the threaded bore 1031a of the central bottom port 1031 discourages inadvertent connection of that tube (e.g., the diptube) to the central bottom port.

First and second annular grooves 165, 167 are formed in the outer cylindrical outer surface 1061 of the valve spool 1007 in the same manner described in connection with valve 101 above. Thus, when the valve spool is in its open position (FIG. 8A) the offset side port 143 is in fluid communication with the offset bottom port 1033 via the first annular groove 165 and the central side port 141 is in fluid communication with the central bottom port 1031 via the second annular groove 167.

Figure 8A:
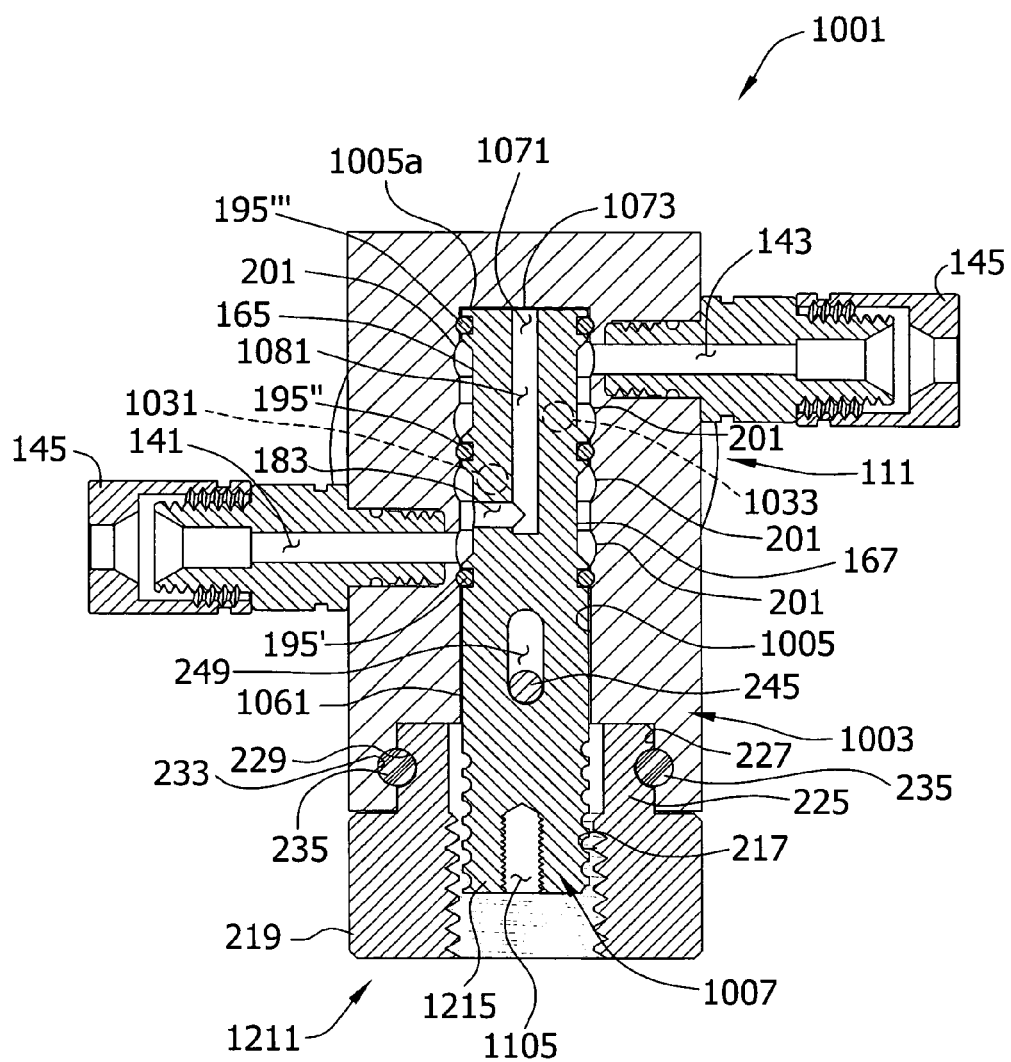
FIGS. 8A and 8B are sections of the valve shown in FIG. 6 (on a plane analogous to the plane 5-5 of FIG. 2) showing the valve in open and closed positions, respectively.
Figure 8B:
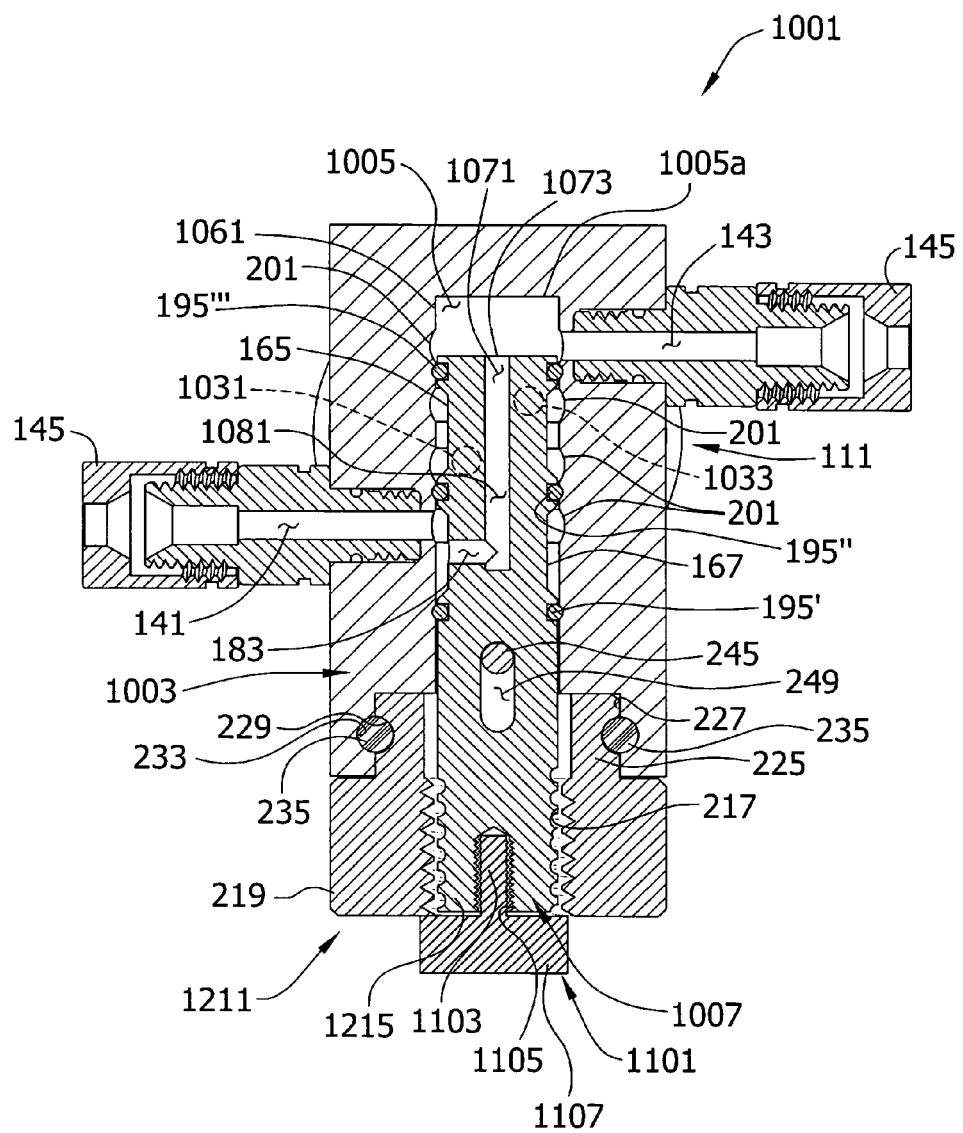

A bypass 1071 is formed within the valve spool 1007 extending from the second annular groove 167 to a bypass port 1073 formed at the end of the spool 1007. The bypass port 1073 is located relatively farther from the longitudinal center of the spool 1007 than both the first and second annular grooves 165, 167. Referring to FIGS. 8A and 8B, for example, the bypass 1071 of the embodiment shown in the drawings comprises an open ended longitudinal passage 1081 within the spool 1007 and a single radial bore 183 in the valve spool extending from the longitudinal passage 1081 to the second annular groove 167. The open end of the longitudinal passage 1081 at the end of the spool is the bypass port 1073. Significantly, forming the bore 1005 with a closed end 1005a and using the open end of the longitudinal passage 1081 as the bypass port 1073 substantially eliminates the possibility that the product will leak out of the valve 1001 at its closed end. The cost of making the spool 1007 is reduced not only because there is no need to form a third annular groove in the outer surface 1061 of the valve spool, but also because there is no need to plug the end of the longitudinal passage in the spool 1081. Likewise, manufacture of the bypass passage 1071 in the spool 1007 requires formation of only a single radial bore 183 (i.e., radial bore 185 discussed above is eliminated). Further, there is no need for an O-ring to seal the closed end of the bore 1005 (i.e., O-ring 195'''' of the valve 101 can be eliminated) for additional cost savings. As shown in FIGS. 8A and 8B, for example, the bypass port 1073 is in fluid communication with the adjacent (blind) end of the bore 1005. Further, only three O-rings 195', 195'', 195''' engage both the outer surface of the valve spool 1007 and the housing 1003 to seal the first and second annular grooves 165, 167 and the bypass port 1073 from one another and the exterior of the valve 1001, except through the ports 141, 143, 1031, 1033 and bypass 1071.

The valve 1001 also comprises a valve spool actuator 219 that is operable to move the valve spool 1007 axially back and forth between its open (FIG. 8A) and closed (FIG. 8B) positions in the manner described above. The valve 1001 may be used to withdraw product from a container 113, either in bubbling mode or closed liquid transfer mode, in generally the same way described above in connection with valve 101. When the valve spool 1007 is in its open position (FIG. 8A) the bypass port 1073 is a dead end at the closed end 1005a of the bore 1005. When the valve spool 1007 is in its closed position (FIG. 8B), the bypass port 1073 communicates with the offset side port 143 via the volume at the end of the bore 1005 vacated by the valve spool 1007 as the valve 1001 was closed. Thus, purging with the protective gas can be achieved in essentially the same manner described above.

Further, the valve spool actuator 219 of the valve 1001 comprises an optional valve lock 1101, best shown in FIG. 8B. The valve lock 1101 is a mechanism that is operable to selectively lock the valve spool 1007 in a particular position (e.g., the closed position) by restraining movement of the valve spool relative to the housing 1003. For example, the valve lock 1101 may be used to lock the valve spool 1007 in its closed position for safely transporting a container of chemical product equipped with the valve 1001.

The valve lock 1101 shown in FIG. 8B, for example, comprises a valve spool retainer 1107 (e.g., a retaining head) having a shaft 1103 which is threadable into a threaded bore 1105 in the end 1215 of the valve spool 1107. When the valve spool 1007 is in its closed position (FIG. 8B) the shaft 1103 can be screwed into the bore 1105 to a position in which the retainer 1107 is adjacent (e.g., in contact with) the end of the valve actuating knob 219. The retainer 1107 is configured so movement of the retainer into the threaded bore 217 in the end of the valve actuating knob 219 is obstructed (e.g., by virtue of the retainer 1107 being at least slightly larger in diameter than the bore 217). When the valve lock 1101 is in this position, rotation of the valve actuating knob 219 that might otherwise move the valve spool 1007 toward its open position is resisted by contact between the retainer 1107 and actuating knob 219. As a result, the valve spool 1007 will remain locked in its closed position until the shaft 1103 is unscrewed and from the bore 1105 a distance sufficient to allow the valve actuating knob 219 to be rotated to move the valve spool 1007 to its open position. It will be understood that a similar valve lock can also be used with the valve 101 or that the valve lock can be omitted without departing from the scope of the invention. A variety of mechanisms can be used to lock the valve spool 1007 without departing from the scope of the invention.

Those skilled in the art will recognize that it is possible to modify the foregoing exemplary embodiments in many ways without departing from the scope of the invention. For example, the configuration of the passageways through the valve 1001 may be other than what is shown in the drawings and described above without departing from the scope of the invention. Likewise, the relative positions of the ports and the corresponding passageways can be changed without departing from the scope of the invention. Further, various different types of connectors can be used to connect the ports to the tube, gas supply line and product transfer line without departing from the scope of the invention. Moreover, the terms "bottom" and "side" as used herein refer to the valve when it is oriented as shown in the drawings. It is understood that the valve 1001 could be rotated in various ways without departing from the scope of the invention. It may also be desirable to close off one end of the bore 105 (e.g., by only forming a bore that extends part way through the housing) to reduce the risk that the product will leak into the environment and/or that contaminants will leak into the valve through the joint between the valve spool and the housing.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A valve for withdrawing a flowable product from a container containing a supply of the flowable product, the valve comprising:
   a housing defining a cylindrical bore having a longitudinal axis, the bore extending only partially through the housing, first and second bottom ports in the housing communicating with the bore, and first and second side ports in the housing communicating with the bore,
   a cylindrical valve spool received in the bore and axially moveable along the longitudinal axis of the bore, the valve spool comprising an outer cylindrical surface, first and second annular grooves in the outer cylindrical surface and distributed axially therealong, a bypass within the valve spool extending from the second annular groove to a port on the end of the valve spool, the first annular groove being located axially on the spool between the second annular groove and said one end of the valve spool; and
   a valve spool actuator for selectively sliding the valve spool within the bore between a first position and a second position,
wherein when the spool is in the first position the first bottom port communicates with the first side port via the first annular groove and the second bottom port communicates with the second side port via the second annular groove, and wherein when the spool is in the second position the first and second bottom ports communicate with each other through the first annular groove and the first and second side ports communicate with each other through the bypass and the second annular groove.

2. A valve according to claim 1, wherein the bypass through the valve spool comprises an open-ended longitudinal passage extending from within the valve spool to said one end of the valve spool, the open end of the passage being the bypass port.

3. A valve according to claim 1, wherein the bypass has only a single radial bore in the valve spool.

4. A valve according to claim 1, wherein at least one O-ring is received in an annular channel in the outer cylindrical surface of the valve spool to form a seal by engagement of the O-ring with the valve spool and the valve housing, the O-ring consisting essentially of a fully fluorinated elastomeric material.

5. A valve according to claim 4, wherein the at least one O-ring consists essentially of a fully fluorinated elastomeric material.

6. A valve according to claim 1, wherein one of the first and second bottom ports is adapted for connection of a tube thereto and the other of the first and second bottom ports is not adapted for connection of the tube thereto.

7. A valve according to claim 1, further comprising a valve lock operable to selectively restrain the valve spool from movement relative to the housing.

8. A valve according to claim 7, wherein the valve lock comprises a valve spool retainer comprising a threaded shaft threadable into a threaded bore in an end of the valve spool.

9. A valve for withdrawing a flowable product from a container containing a supply of the flowable product, the valve comprising:
   a housing defining a cylindrical bore having a longitudinal axis, first and second bottom ports in the housing communicating with the bore, and first and second side ports in the housing communicating with the bore,
   a cylindrical valve spool received in the bore and axially moveable along the longitudinal axis of the bore, the valve spool comprising an outer cylindrical surface, first and second annular grooves in the outer cylindrical surface and distributed axially therealong, a bypass within the valve spool extending from the second annular groove to a port on the end of the valve spool, the first annular groove being located axially on the valve spool between the second annular groove and the bypass port, the bypass port being adjacent an end of the bore; and
   a valve spool actuator for selectively sliding the valve spool within the bore between a first position in which the first bottom port communicates with the first side port via the first annular groove and the second bottom port communicates with the second side port via the second annular groove and a second position in which the first and second bottom ports communicate with each other through the first annular groove and the first and second side ports communicate with each other through the bypass and the second annular groove,
   wherein the bypass port is in fluid communication with said adjacent end of the bore.

10. A valve according to claim 9, wherein the bypass has only a single radial bore in the valve spool.

11. A valve according to claim 10, wherein the bypass through the valve spool comprises an open-ended longitudinal passage extending from within the valve spool to said one end of the valve spool, the open end of the passage being the bypass port.

12. A valve according to claim 9, wherein the bore defined by said housing extends only partially through the housing.

13. A valve according to claim 9, further comprising only three O-rings on the outer surface of the valve spool forming seals between the valve spool and the housing.

14. A valve according to claim 13, wherein said only three O-rings consist essentially of a fully fluorinated elastomeric material.

* * * * *